United States Patent [19]

Malek et al.

[11] Patent Number: 5,606,560

[45] Date of Patent: Feb. 25, 1997

[54] BETWEEN A BASE STATION AND A PORTABLE DEVICE

[75] Inventors: Charles J. Malek, Crystal Lake; David L. Weigand, Buffalo Grove, both of Ill.

[73] Assignee: Motorola, Inc., Schaumburg, Ill.

[21] Appl. No.: 311,309

[22] Filed: Sep. 23, 1994

[51] Int. Cl.$^6$ .................................. H04J 3/06; H04J 3/12
[52] U.S. Cl. ............................ 370/347; 370/350; 379/58; 455/56.1
[58] Field of Search .................................. 370/95.3, 95.1, 370/95.2, 110.1, 100.1, 103; 379/60, 57, 61, 59, 58, 63; 455/33.2, 33.1, 34.2, 54.1, 56.1, 51.1; 340/825.44

[56] References Cited

U.S. PATENT DOCUMENTS

| | | | |
|---|---|---|---|
| 3,983,498 | 9/1976 | Malek | 327/156 |
| 4,882,746 | 11/1989 | Shimada | 379/63 |
| 5,119,375 | 6/1992 | Paneth et al. | 370/95.1 |
| 5,142,534 | 8/1992 | Simpson et al. | 370/95.1 |
| 5,144,668 | 9/1992 | Malek et al. | 380/48 |
| 5,212,715 | 5/1993 | Pickert et al. | 375/366 |
| 5,228,029 | 7/1993 | Kotzin | 370/95.1 |
| 5,276,686 | 1/1994 | Ito | 370/95.1 |

FOREIGN PATENT DOCUMENTS

| | | |
|---|---|---|
| 663737A2 | 7/1995 | European Pat. Off. . |
| 2279849 | 1/1995 | United Kingdom . |
| 94/05107 | 3/1994 | WIPO . |
| 94/05101 | 3/1994 | WIPO . |

Primary Examiner—Wellington Chin
Assistant Examiner—Melisssa Kay Carman
Attorney, Agent, or Firm—John J. King

[57] ABSTRACT

A method and apparatus increases spectrum efficiency in a wireless communication system having base stations which may be positioned to operate within range of one another. The method and apparatus eliminates the requirement for a base station to periodically transmit to maintain synchronization with an associated handset (504). The handset effectively assumes the role of a base station when making a call (508). The handset will synchronize with other handset traffic or another base station which is within range (506). The handset will then page the base station (510). Eliminating the requirement that the base station repeatedly transmit a signal to maintain sync with a handset significantly increases the available spectrum allocation for providing communication. Reversing the role of a handset also enables handset-to-handset communication independent of the base station (808).

8 Claims, 8 Drawing Sheets

BETWEEN A BASE STATION AND A
PORTABLE DEVICE

FIELD OF THE INVENTION

This invention is related to radio frequency (RF) communication systems, and more particularly to a method and apparatus for increasing efficient use of spectrum.

BACKGROUND OF THE INVENTION

In wireless communication systems, effort has been made to increase the use of spectrum to allow for a greater number of users of a given frequency band. One example of a technique to increase spectrum efficiency is a frequency division multiple access (FDMA) technique. In a conventional FDMA system, a given frequency band is divided into a number of channels, wherein each channel is occupied by one user. An FDMA system can also be a time division duplex (TDD) system wherein a given RF channel is used for transmitting frames in both the forward and reverse directions of communication which are separated in time.

Other techniques comprise digital multiple access communication systems. One such conventional digital multiple access technique for increasing efficient use of spectrum is a time division multiple access (TDMA) technique. In a TDMA system, each channel is divided into a plurality of slots for the transmission of signals. Each time slot may be allocated to a different call. A TDMA system can also employ TDD techniques. Accordingly, a number of calls can be simultaneously transmitted on a single channel or frequency.

Finally, increased spectrum efficiency can be achieved by spread spectrum techniques, in the form of either a slow frequency hopper system or a direct-sequence CDMA system. In a slow frequency hopper system, the carrier frequency of the signal is changed at a predetermined rate over a wide range of possible frequencies in a pseudo-random sequence known in advance by the receiver. Generally, spread spectrum techniques reduce the effects both intentional or unintentional interference. Direct sequence CDMA systems allow multiple users to share the same spectrum wherein each user is assigned a unique pseudonoise code sequence. The signal is spread by the wide bandwidth pseudo-noise sequence known in advance by the receiver.

In a conventional multiple access communication system, a base station periodically transmits a beacon or synchronization signal to maintain synchronization with an associated handset. For example, in a time division duplex multiple access system, a slot in a time frame must be occupied even if the base station is not in a call. Depending upon the communication system, available resources for providing communication between devices are used to maintain synchronization between devices which are not in communication. Accordingly, there is a need for a method and apparatus for increasing spectrum efficiency to allow a greater number of users to occupy a given frequency band.

2

DESCRIPTION OF THE PREFERRED
EMBODIMENTS

In a wireless communication system, spectrum is scarce and must be used efficiently to enable the greatest number of users to communicate in a given frequency band. The method and apparatus of the present invention provides for increased spectrum efficiency by eliminating the requirement for base stations to maintain synchronization with handsets. In particular, a base station would not continuously transmit a synchronization signal, but only transmit a page and handset code signal when a call is received by the base station. In the event of a handset generated call, the handset will effectively function as a base station (i.e a master device) and ring its associated base station. The handset will then revert to conventional handset operation (i.e. a slave device). In a conventional slow frequency hopper system having 83 channels for example, a maximum of 83 base stations could operate on the system at one time. However, the apparatus of the present invention could support 83 calls in progress at a single time. Accordingly, the number of base stations positioned within range of one another can be considerably increased assuming that, on the average, not all base stations will be in use at all times.

Figure 1:
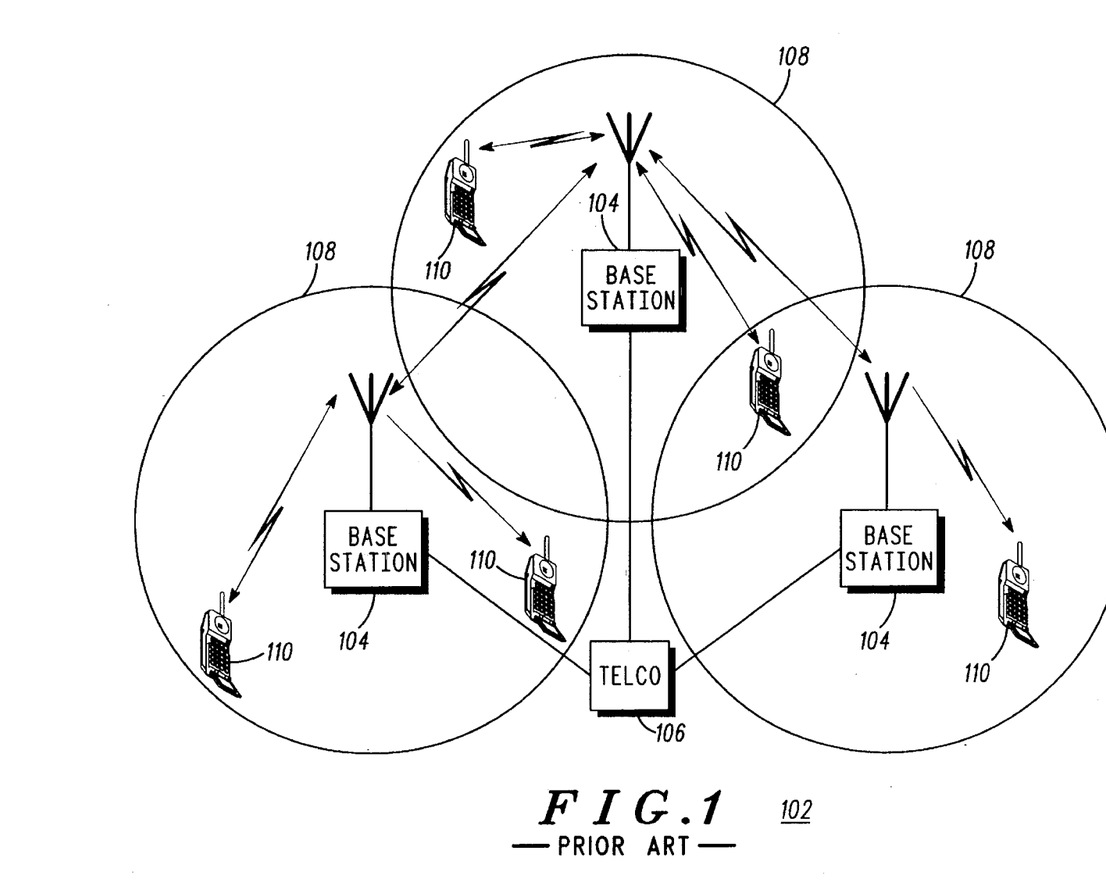
FIG. 1 is a plan view of a wireless communication system having multiple base stations coupled to the public system telephone network.

Turning first to FIG. 1, a conventional wireless communication system 102 is shown. The wireless communication system has a plurality of base stations 104 each of which provide RF coverage over an area 108. Each base station may be coupled to a public system telephone network 106. However, it will be understood that the circuit and method of the present invention could be implemented in a wireless communication system having base stations which are not coupled to a public system telephone network. The base stations could be coupled together in an independent network, or could be stand alone units which happen to operating in the same frequency bands. Each base station is also adapted to communicate with one or more handsets 110. Finally, each base station can communicate with another base station which is within range by way of RF signals. Preferably, control signals, including synchronized signals can be transmitted by RF between the base stations.

Figure 2:
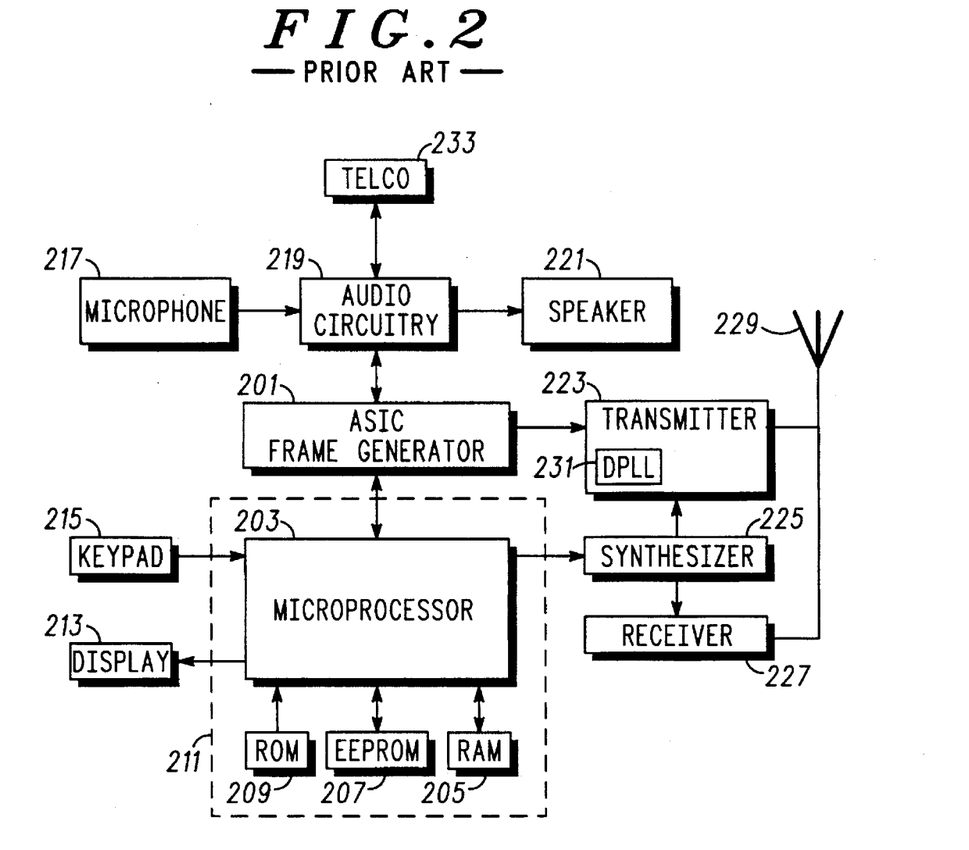
FIG. 2 is a block diagram of circuitry for a conventional wireless base station or handset.

Turning now to FIG. 2, a block diagram shows a conventional base or handset circuit. In the preferred embodiment, an ASIC (Application Specific Integrated Circuit) 201, such as a CMOS ASIC in the MDA08 technology or H4C also available from Motorola, Inc. and microprocessor 203, such as a 68HC11 microprocessor available from Motorola, Inc., combine to generate the communication protocol shown in FIG. 4. ASIC 201 preferably includes a separate search engine to detect a second synchronization source according to the present invention. The second search engine could be a separate digital phase lock loop (DPLL) or an oversampled cross-correlator. Digital phase lock loops are well known in the art. An example of a digital phase lock loop can be found in U.S. Pat. No. 3,983,498 entitled "Digital Phase Lock Loop" which issued on Sep. 28, 1976 to Malek. The entire contents of U.S. Pat. No. 3,983,498 is incorporated by reference. An example of an oversampled cross-correlator can be found in U.S. Pat. No. 5,117,441 entitled "Method and Apparatus For Real Time Demodulation of a GMSK Signal By A Non-Coherent Receiver" issued on May 26, 1992 to Weigand. The entire contents of U.S. Pat. No. 5,117,441 is also incorporated by reference.

The microprocessor 203 uses RAM 205, EEPROM 207, and ROM 209, consolidated in one package 211 in the preferred embodiment, to execute the steps necessary to generate the protocol and to perform other functions for the communication unit, such as writing to a display 213, accepting information from a keypad 215, and controlling a frequency synthesizer 225. The ASIC 201 processes audio transformed by the audio circuitry 219 from a microphone 217 and to a speaker 221. Certain message fields are constructed by the ASIC 201 and populated by the audio circuitry 219, the microprocessor 203, and others are constructed by the ASIC 201, which generates the message frame and transfers it to a transmitter 223. Transmitter 223 transmits through an antenna 229 using carrier frequencies produced by the frequency synthesizer 225 in the hopping manner chosen for the system and directed by the microprocessor 203. Information received by the communication unit's antenna 229 enters the receiver 227 which demodulates the symbols comprising the message frame using the carrier frequencies from the frequency synthesizer 225, in accord with the hopping manner chosen for the system. The ASIC 203 then parses the received message frame into its constituent parts. If the circuitry of FIG. 2 is incorporated in a residential base station, the audio circuitry of the base station may be coupled to a telco network 233.

Figure 3:
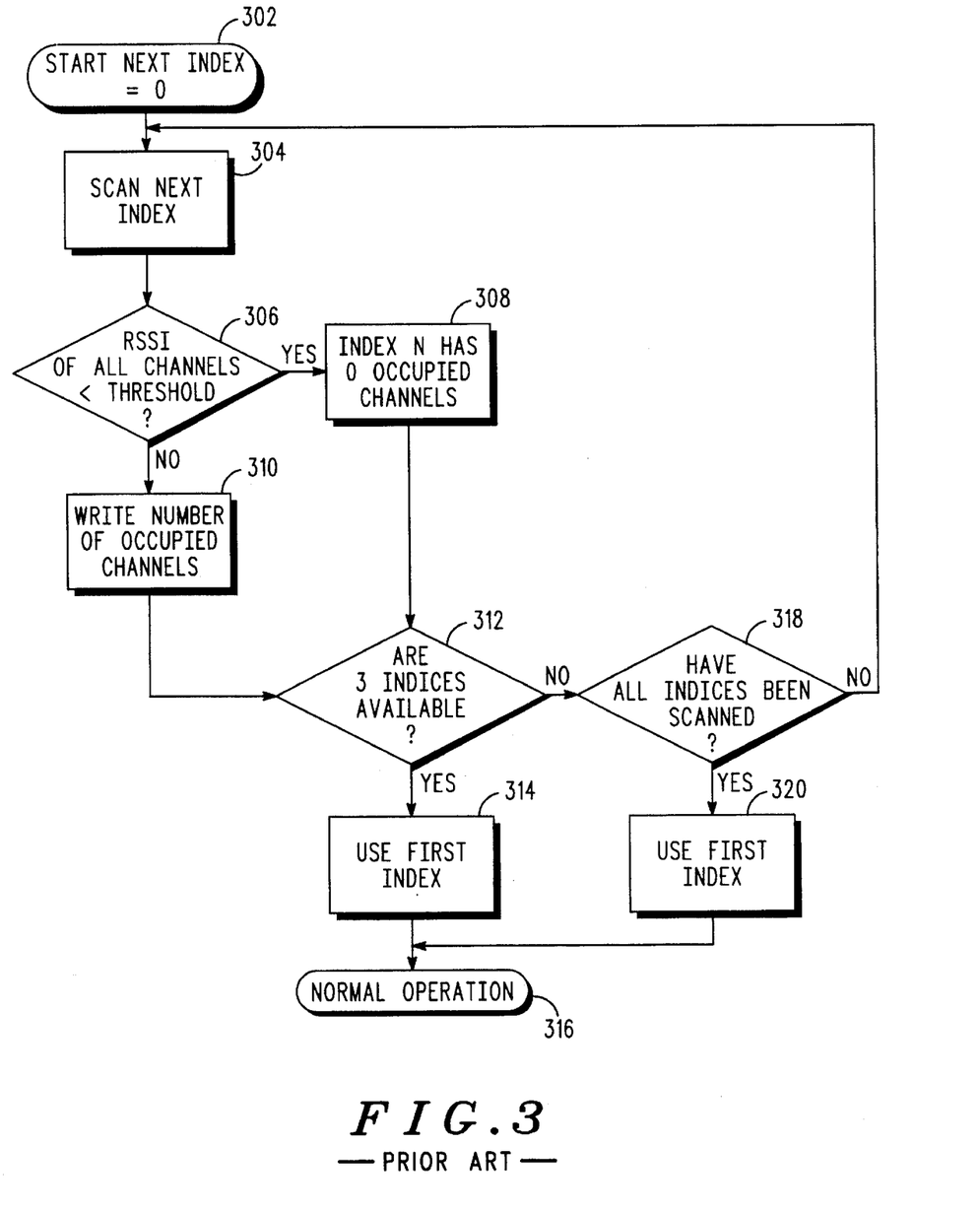
FIG. 3 is a flow diagram for showing the preferred steps for determining an available index in a slow frequency hopper system.

Turning now to FIG. 3, the preferred steps for following the hop sequence in a conventional frequency hopping system are shown. At a step 302, the index (i.e. an offset into a predetermined sequence of channels starting with a first channel) is set equal to zero. At a step 304, the base station scans the next index (same sequence of channels starting with the second channel in the sequence) and determines if the receiver signal strength indicator (RSSI) of all channels is less than predetermined threshold at a step 306. If the RSSI of all channels is less than a predetermined threshold, the base station stores an indication that index N has zero occupied channels at a step 308. If the RSSI of all channels is not less than a threshold at step 306, the base station indicates the number of occupied channels at a step 310.

At a step 312, the base station determines whether three indices are available having no occupied channels. If three indices are available, the base station selects the first index at a step 314 and assumes normal operation at a step 316. However, if three indices are not available, the base station determines whether all indices have been scanned at a step 318. If all indices have not been scanned, the base station scans the next index at step 304. If all indices have been scanned, the base station uses the best available index depending on the least number of occupied channels having an RSSI value greater than a predetermined threshold. The three indices are used to form a next best list. If the index is corrupted during a call, a request could be sent to change the index. The next best list may be periodically updated depending upon radio resources and other limitations. While the RSSI determination is described above, evaluation of channel quality by RSSI is merely given by way of example. Any other method for determining signal quality could be used within the scope of the present invention.

Figure 4:
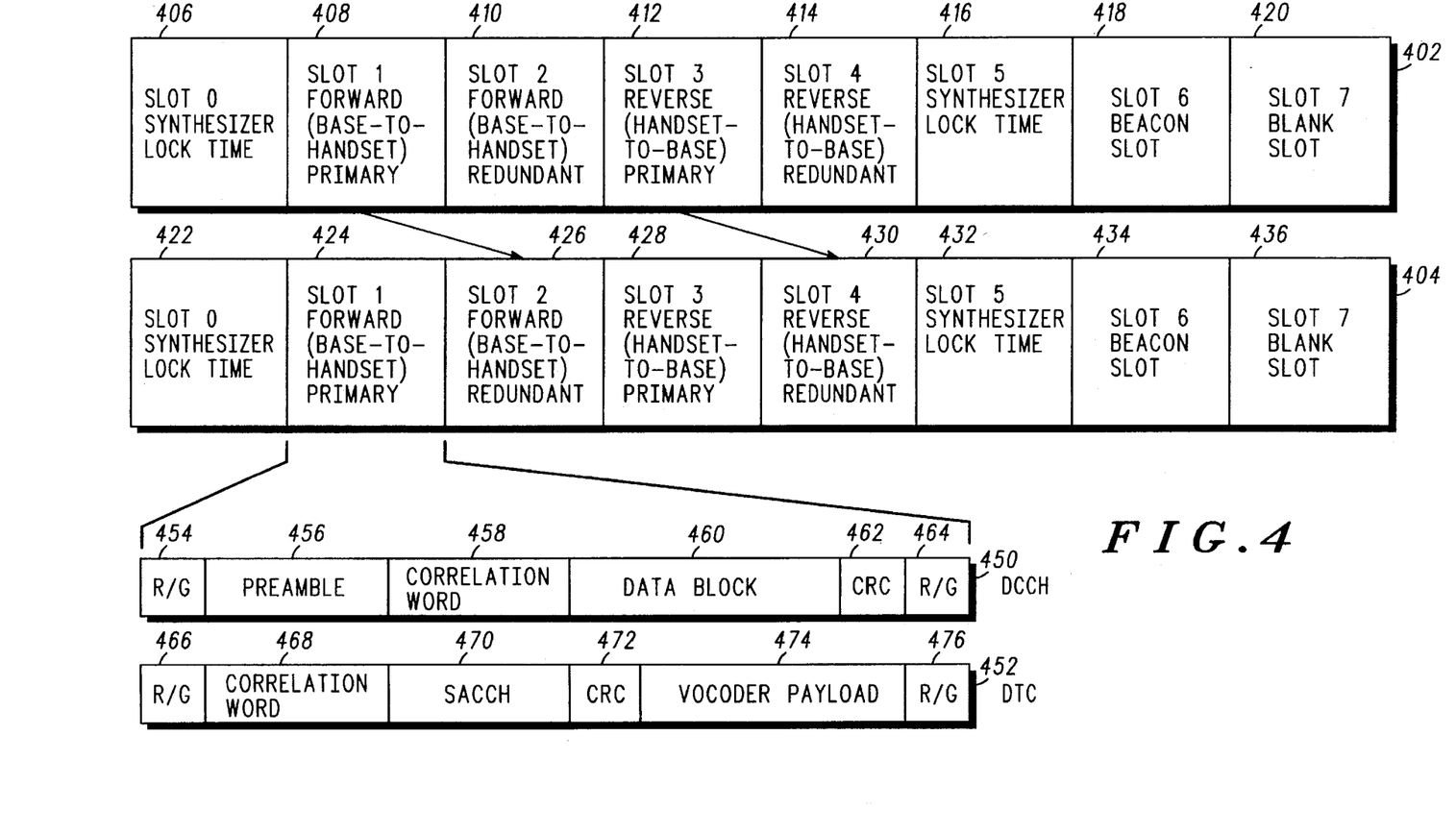
FIG. 4 is a frame diagram of an air interface protocol for synchronizing the handset to a base station.
Figure 7:
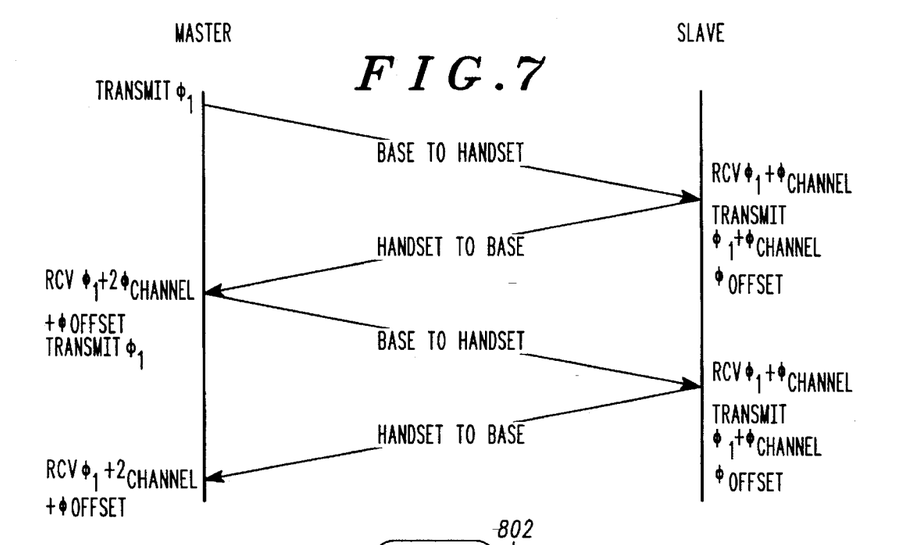
FIG. 7 is a timing diagram showing the transmission of signals between a master and a slave operating in a communication system according to the present invention.

Turning first to FIG. 4, an air interface protocol for synchronizing base stations is shown. Preferably, both primary and redundant frames 402 and 404 are transmitted between the base stations as shown in FIG. 7. A method and apparatus for maintaining frequency and bit synchronization having primary and redundant frames is described in Pickert et al., U.S. Pat. No. 5,212,715 entitled "Digital Communication Signaling System" which issued on May 18, 1993. Referring to the specific slots, frame 402 includes a slot 406 for synthesizer lock time. The following four slots are for forward primary and forward redundant data fields and reverse primary and reverse redundant data fields. In particular, slot 408 is for a forward (base-to-handset) primary data slot. Slot 410 is a forward redundant data field. Slot 412 is a reverse (handset-to-base) primary data field, while slot 414 is a reverse redundant data field. Slot 416 is a synthesizer time slot. The following two slots are beacon slot 418 and a blank slot 420. The beacon slot is used to transmit a base synchronization field which is used to synchronize the base stations. A beacon message would comprise a plurality of beacon signals transmitted on the beacon slot. The blank slot can be used to detect handset traffic of another base station to synchronize to that base station. Alternatively, the beacon slot could be used to detect a beacon signal to synchronize to another base station.

As shown in FIG. 4 the forward primary time slot 408 of primary frame 402 is also transmitted in forward redundant slot 426 of the redundant frame 404. That is, the redundant slot contains information matching the prior frames primary slot. Similarly, the reverse primary slot 412 of primary frame 402 is transmitted in the reverse redundant slot 430 of redundant time frame 404. The operation of transmission of primary and redundant data fields is well known in the art and will not be described in further detail. However, it will be understood that a system transmitting a redundant slot need not be employed according to the present invention, and a single frame could be transmitted.

FIG. 4 also shows the preferred slot structure for a data slot either the forward or reverse direction, or a primary slot or a redundant slot in either direction. The preferred fields for a digital control channel (DCCH) field 450 is shown. Each DCCH data slot comprises a ramp/guard (R/G) field 454, a preamble field 456, a sync field 458, a data field 460, a cyclic redundancy check (CRC) field 462 and a R/G field 464. A digital traffic field 452 is also shown. The preamble field represents a marker signal for identifying the base station. The handset could synchronize to the base station based upon the preamble transmitted on the digital control channel. In the reverse channel, the marker signal would identify the handset. The digital traffic channel data slot comprises a R/G field 466, a sync field 468, a slow associated control channel (SACCH) 470, a CRC field 472, a vocoder payload field 474, and a R/G field 476. While the preferred data field protocol is described in FIG. 4, additional or fewer fields may be transmitted within the scope of the present invention.

Figure 5:
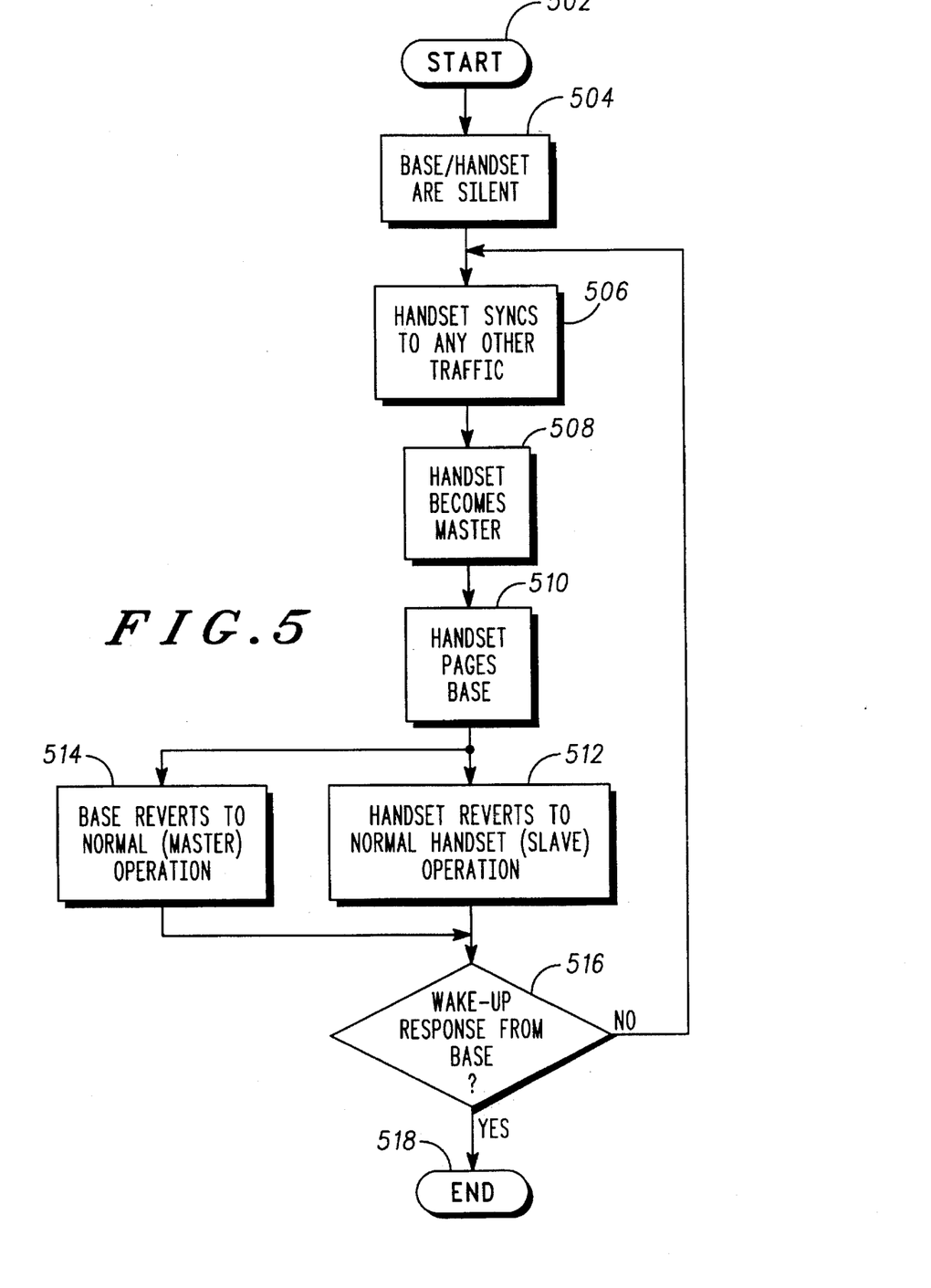
FIG. 5 is a flow chart showing a method for increasing spectrum occupancy according to the present invention.

Turning now to FIG. 5, a flow chart shows a method for increasing spectrum occupancy according to the present invention. The conventional assignment of synchronization master is a base and synchronization slave is a handset. This conventional assignment is reversed according to the present invention to maintain a quiet spectrum in a slow frequency hopper system. As will be described in more detail in reference to FIG. 8, the role reversal will also permit handset-to-handset intercom in a mobile communications environment having a personal base station (i.e. office or residential base station) adapted to communicate with multiple handsets.

Referring to FIG. 5, both the base and the handset of a base/handset pair are not in a call, and therefore do not transmit any signals at a step 504. When the handset initiates a call, the handset syncs to any other base station by detecting a beacon signal on a beacon slot or detecting handset traffic on a blank slot at a step 506. The handset then assumes a master role at a step 508. As a master, the handset rings the base station at a step 510. The ring can be transmitted in data block 460 in a reverse (handset-to-base) digital control channel (DCCH) block 450. At a step 512, the handset reverts to normal handset operation as a slave. Similarly, the base reverts to normal base operation as a master at a step 514. If a wake-up response from the base is received at step 516, normal operation of the base/handset pair is assumed at step 518. If no response is received, the handset attempts to sync to other handset traffic at step 506.

Figure 6:
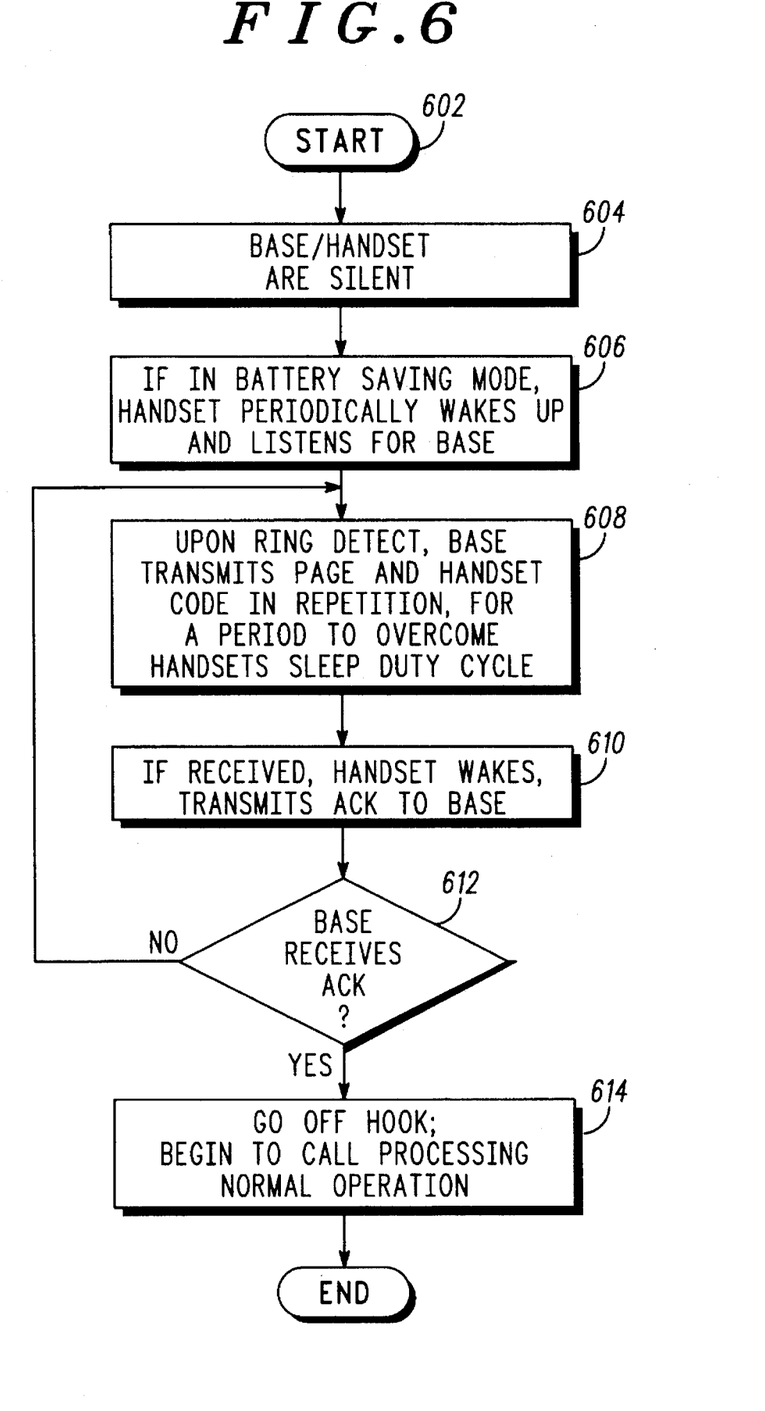
FIG. 6 is a flow chart showing a method for receiving a landline generated call according to the present invention.

Turning now to FIG. 6, the method for receiving a call is shown according to the present invention is shown. The base station and handset remain silent at a step 604. In order to receive a call, the handset must detect a page from the base station. If the handset is in the battery saving mode, the handset wakes periodically and listens for the base station at a step 606. Upon ring detection, for example a call from a landline network, the base transmits page and handset code in repetition at a step 608. The base station preferably transmits the page and handset code for an extended period to overcome the handset sleep duty cycle and the time based disparity accumulated while asleep. If the page and handset code are received, the handset transmits an acknowledge to the base station at a step 610. If the base station receives an acknowledge at a step 612, the base station goes off hook, begins call processing and normal operation at a step 614. If no acknowledge is received by the base, the base again transmits a page and handset code at step 608.

Turning now to FIG. 7, a call flow diagram shows the operation of the synchronization master and a synchronization slave, and particularly the configuration of the handset as a synchronization master and either a handset or a base station as a synchronization slave. The usual role of a base station is that of synchronization master, while the usual role of a handset is that of synchronization Slave. Conventionally, in a slow frequency hopper system, a beacon in the DCCH slot format is transmitted by the synchronization master at least once per hopping revolution to provide handset synchronization and also to indicate that no ring or page has occurred.

As shown in FIG. 7, the synchronization master always transmits in a fixed phase($\Phi_1$). The slave then adjusts its single frame pointer to the transmitted $\Phi_1$+ the phase delay $\Phi_d$ of the channel. Then, the synchronization slave transmits in alignment with its received phase, plus a delay $\Phi_{offset}$, in a TDD system. The synchronization master then adjusts its second frame pointer to the traffic received from the synchronization slave, receiving a phase of $\Phi_1+2\Phi_d+\Phi_{offset}$. This synchronization protocol prevents the transmitted phase of the synchronization master from advancing with every transmission, as it would if both entities behaved as a synchronization slave.

Figure 8:
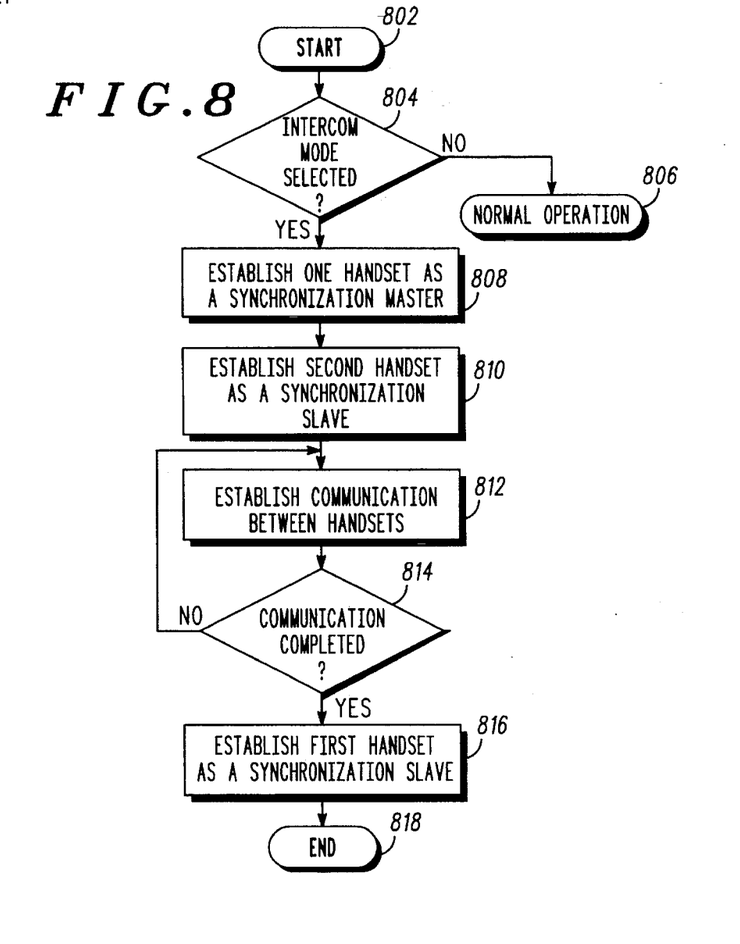
FIG. 8 is a flow chart showing an alternate use of handsets operating in a wireless communication system according to the present invention.

Turning now to FIG. 8, an alternate use of handsets based upon the reversed role of a handset in a communication system is shown. By reversing the role of a handset to function as a base, a pair of handsets could communicate independently of the base. At a step 804, an intercom mode is selected. The intercom mode could be selected at the base or by a handset. One of the handsets is then established as a synchronization master at a step 808. The second handset remains a synchronization slave at a step 810. The two handsets then communicate similar to a normal base handset pair at a step 812. If the communication is completed at a step 814, the first handset reverts to a synchronization slave at a step 816. This alternate use of handsets provide greater functionality to a wireless communication system adapted to operate with multiple handsets.

Figure 9:
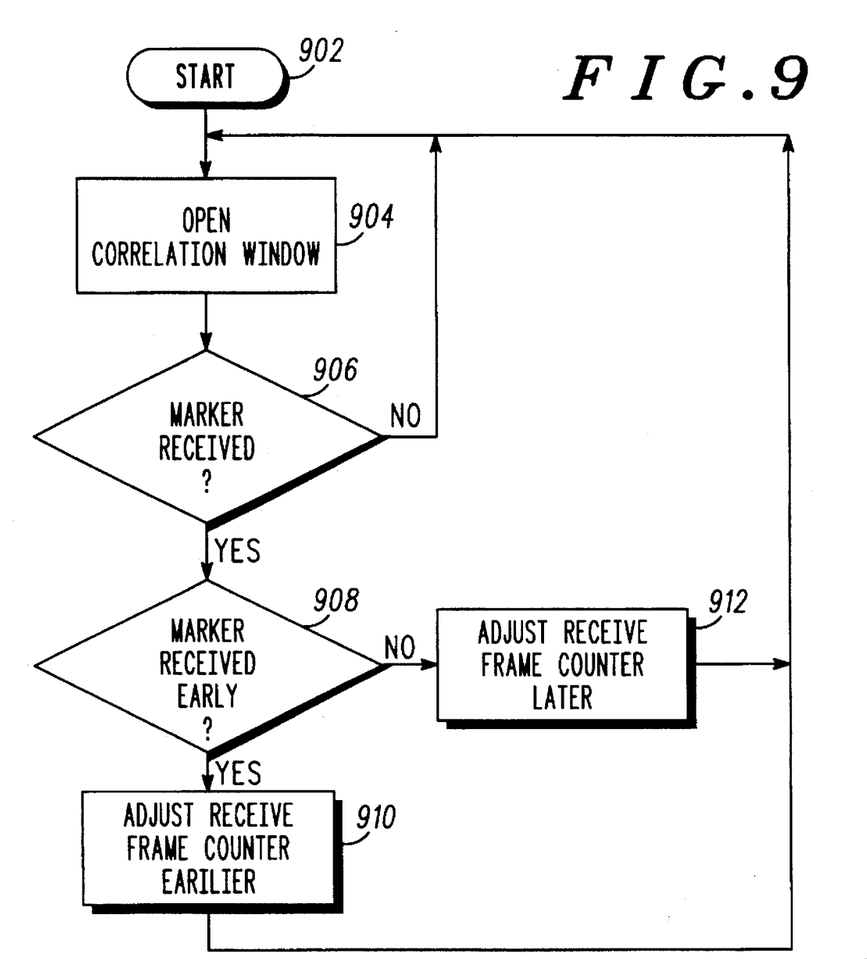
FIG. 9 is a flow chart showing the steps for synchronizing handsets according to the present invention.

Turning now to FIG. 9, a preferred method for achieving or maintaining synchronization between master and slave entities by use of DPLL 231 is disclosed (i.e. synchronizing a handset to a base station or a handset to a handset). In particular, one slot is established as a sync source at a step 904. The base station will then determine whether a valid marker signal is received at a step 906. If a valid marker signal is received, the base station will then determine whether the marker is received early at a step 908. If the beacon is received early, the base station will adjust the frame counter early at a step 910. If however the beacon is not received early, the base station will adjust the frame counter later at a step 912. However, it will be understood that other methods which are known in the art could be employed to maintain synchronization.

In summary, the present invention describes a method and apparatus for increasing spectrum efficiency in a wireless communication system having base stations which may be positioned to operate within range of one another. The method and apparatus eliminates the requirement for a base station to periodically transmit signals to maintain synchronization with an associated handset. According to the present invention, the handset effectively assumes the role of a base station when making a call. The base station will synchronize with other handset traffic or another base station which is within range. The handset will then ring the base station. Eliminating the requirement that the base station repeatedly transmit a signal to maintain sync with a handset significantly increases the available spectrum allocation for providing communication. Reversing the role of a handset also enables handset to handset communication independent of the base station.

While specific embodiments are described above, variations and modifications of Applicants' will fall within the spirit and scope of the invention. Applicants' invention shall be limited only the appended claims.

We claim:

1. A method for increasing spectrum efficiency in a digital multiple access wireless communication system having a base station and a portable device adapted to communicate with said base station, said method comprising the steps of:

maintaining radio frequency (RF) silence at said base station;

establishing said portable device as a synchronization master upon originating a call from said portable device; and establishing a communication link between said portable device and said base station.

2. The method for increasing spectrum efficiency according to claim 1 further including a step of establishing the base station as a synchronization slave.

3. The method for increasing spectrum efficiency according to claim 2 further including a step of re-establishing the base station as a synchronization master after said communication link has been established.

4. The method for increasing spectrum efficiency according to claim 1 further including a step of re-establishing the portable device as synchronization slave.

5. The method for increasing spectrum efficiency according to claim 1 further including a step of periodically monitoring, at said portable device, for a page signal transmitted by said base station.

6. The method for increasing spectrum efficiency according to claim 1 wherein said step of establishing a communication link between portable device and a base station comprises establishing a communication link between a portable device and a personal base station.

7. The method for increasing spectrum efficiency according to claim 1 wherein said step of establishing a communication link comprises transmitting signals on a Time Division Multiple Access (TDMA) communication system.

8. A method for increasing spectrum efficiency in a time division multiple access (TDMA) frequency hopper communication system having a base station and a portable device adapted to communicate with said wireless base station, said method comprising the steps of:

maintaining radio frequency (RF) silence at said base station and said portable device;

periodically monitoring, at said portable device, for a page signal transmitted by said base station;

establishing said portable device as a synchronization master upon originating a call from said portable device;

transmitting a signal from said portable device to said base station to establish a communication link;

establishing the base station as a synchronization slave upon receiving said signal from said portable device;

establishing a communication link between said portable device and said base station;

transmitting an acknowledge signal from said base station to said portable device;

re-establishing the base station as synchronization master;

re-establishing said portable device as synchronization slave; and continuing communication.

* * * * *

UNITED STATES PATENT AND TRADEMARK OFFICE
CERTIFICATE OF CORRECTION

PATENT NO. : 5,606,560
DATED : February 25, 1997
INVENTOR(S) : Malek et al.

It is certified that error appears in the above-indentified patent and that said Letters Patent is hereby corrected as shown below:

On the title page: Item [54] and Column 1, line 1,

Please insert --SYNCHRONIZATION--, before "BETWEEN".

Signed and Sealed this

Sixteenth Day of September, 1997

Attest:

BRUCE LEHMAN

Attesting Officer

Commissioner of Patents and Trademarks